(12) United States Patent
Miao et al.

(10) Patent No.: US 9,992,678 B2
(45) Date of Patent: Jun. 5, 2018

(54) NETWORK LOCKING OR CARD LOCKING METHOD AND DEVICE FOR A MOBILE TERMINAL, TERMINAL, SIM CARD, STORAGE MEDIA

(71) Applicant: ZTE Corporation, Shenzhen, Guangdong (CN)

(72) Inventors: Haixiang Miao, Shenzhen (CN); Ke Yang, Shenzhen (CN); Wei Li, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days. days.

(21) Appl. No.: 15/114,138

(22) PCT Filed: May 15, 2014

(86) PCT No.: PCT/CN2014/077596
§ 371 (c)(1),
(2) Date: Jul. 26, 2016

(87) PCT Pub. No.: WO2015/109692
PCT Pub. Date: Jul. 30, 2015

(65) Prior Publication Data
US 2017/0013451 A1    Jan. 12, 2017

(30) Foreign Application Priority Data
Jan. 26, 2014   (CN) .......................... 2014 1 0038404

(51) Int. Cl.
*H04M 1/66*      (2006.01)
*H04W 12/06*   (2009.01)
(Continued)

(52) U.S. Cl.
CPC ......... *H04W 12/06* (2013.01); *H04L 61/6054* (2013.01); *H04L 63/0853* (2013.01); *H04W 8/18* (2013.01); *H04W 88/02* (2013.01)

(58) Field of Classification Search
None
See application file for complete search history.

(56) References Cited

U.S. PATENT DOCUMENTS

| 2004/0043792 A1* | 3/2004 | Simmons ............. H04M 15/47 455/558 |
| 2006/0120531 A1 | 6/2006 | Semple |

(Continued)

FOREIGN PATENT DOCUMENTS

| CN | 101072403 A | 11/2007 |
| CN | 101141718 B | 12/2010 |

(Continued)

OTHER PUBLICATIONS

Supplementary European Search Report in European application No. 14879632.9, dated Nov. 14, 2016, 10 pgs.

(Continued)

*Primary Examiner* — German J Viana Di Prisco
(74) *Attorney, Agent, or Firm* — Cooper Legal Group, LLC

(57) ABSTRACT

A method and device for network/card locking of a mobile terminal, a terminal, a Subscriber Identity Module (SIM) card and a storage medium are provided. The method for card locking of a mobile terminal includes that: encrypted data sent by a mobile terminal is received; it is authenticated, according to the encrypted data, whether the mobile terminal can initialize a SIM card, and an authentication result is obtained; and the authentication result indicating whether the mobile terminal can initialize the SIM card is returned to the mobile terminal.

12 Claims, 10 Drawing Sheets

(51) Int. Cl.
*H04W 8/18* (2009.01)
*H04L 29/12* (2006.01)
*H04L 29/06* (2006.01)
*H04W 88/02* (2009.01)

(56) References Cited

U.S. PATENT DOCUMENTS

| | | |
|---|---|---|
| 2007/0178885 A1 | 8/2007 | Lev |
| 2008/0113687 A1* | 5/2008 | Prendergast ........ H04L 63/0853 455/558 |
| 2012/0220269 A1 | 8/2012 | Feng |
| 2012/0282891 A1 | 11/2012 | Mohammed |
| 2013/0273911 A1 | 10/2013 | Mohammed et al. |
| 2014/0040991 A1* | 2/2014 | Potonniee ............... H04L 63/08 726/4 |
| 2014/0242951 A1 | 8/2014 | Mohammed et al. |
| 2015/0024708 A1 | 1/2015 | Mohammed et al. |
| 2015/0163661 A1 | 6/2015 | Mohammed et al. |
| 2015/0249918 A1* | 9/2015 | Li .......................... H04W 12/04 380/270 |
| 2016/0050555 A1 | 2/2016 | Mohammed et al. |

FOREIGN PATENT DOCUMENTS

| | | |
|---|---|---|
| CN | 102056148 A | 5/2011 |
| CN | 102088692 A | 6/2011 |
| CN | 103200562 A | 7/2013 |
| CN | 103415010 A | 11/2013 |
| WO | 2006036521 A1 | 4/2006 |

OTHER PUBLICATIONS

International Search Report in international application No. PCT/CN2014/077596, dated Oct. 31, 2014, 2 pgs.
English Translation of the Written Opinion of the International Search Authority in international application No. PCT/CN2014/077596, dated Oct. 31, 2014, 11 pgs.

* cited by examiner

NETWORK LOCKING OR CARD LOCKING METHOD AND DEVICE FOR A MOBILE TERMINAL, TERMINAL, SIM CARD, STORAGE MEDIA

TECHNICAL FIELD

The present disclosure relates to the field of mobile communications, and in particular to a method and device for network/card locking of a mobile terminal, a terminal, a Subscriber Identity Module (SIM) card and a storage medium.

BACKGROUND

More and more mobile terminals are sold in an operator customization mode, wherein a network locking function is one of important customization demands. Only one or more SIM cards or Universal Subscriber Identity Module (SIM) cards allowed to be used by an operator customizing a mobile terminal having the network locking function can be adopted on this type of mobile terminal, and SIM/USIM cards of other operators can not be normally used after being inserted into this type of mobile terminal. In order to facilitate descriptions, SIM/USIM cards are collectively, below, referred to as SIM cards in the present disclosure. The network locking function may guarantee that a user is only served by a specific operator and ensure benefits of the operator.

A common network locking method includes: processing network locking parameters by a certain encryption method and then storing the network locking parameters in a non-volatile data area of a mobile terminal; every time the mobile terminal is started, reading network locking parameters from a SIM card and relevant information, and comparing the network locking parameters and the relevant information with the network locking parameters stored in the non-volatile data area; if they are matched, allowing the mobile terminal to further read International Mobile Subscriber Identification Number (IMSI) information about the SIM card, and initializing the SIM card; otherwise, prohibiting the mobile terminal from reading the IMSI information about the SIM card to terminate an initialization flow of the mobile terminal so as to realize network locking.

The traditional art has the defects that: many crack organizations can obtain and modify network locking parameters in a mobile terminal so as to crack this network locking method, thereby damaging benefits of operators.

SUMMARY

In order to overcome the defects, the embodiments of the present disclosure provide a method and device for network/card locking of a mobile terminal, a terminal, a SIM card and a storage medium.

In a first aspect, according to an embodiment of the present disclosure, a method for card locking of a mobile terminal is provided, which may be applied to a SIM card and may include the steps as follows.

Encrypted data sent by a mobile terminal is received.

It is authenticated, according to the encrypted data, whether the mobile terminal is capable of initializing the SIM card, and an authentication result is obtained.

The authentication result is returned to the mobile terminal.

Preferably, the method may further include the steps as follows.

A first International Mobile Equipment Identification Number (IMEI) sent by the mobile terminal is received.

It is judged, according to the first IMEI, whether a binding relationship exists between the mobile terminal and the SIM card, and a judgment result is obtained, and a random number is generated according to the first IMEI.

Both the random number and the judgment result indicating that the binding relationship exists between the mobile terminal and the SIM card are returned to the mobile terminal.

Preferably, the step that it is judged, according to the first IMEI, whether the binding relationship exists between the mobile terminal and the SIM card and the judgment result is obtained may specifically include the steps as follows.

When a second IMEI is pre-stored in the SIM card, it is determined whether the received first IMEI matches with the second IMEI and a determination result is obtained.

When the determination result indicates that the first IMEI matches with the second IMEI, the judgment result indicating that the binding relationship exists between the mobile terminal and the SIM card is obtained.

When the second IMEI is pre-stored in the SIM card, the first IMEI is recorded to complete binding between the SIM card and the mobile terminal, and the judgment result indicating that the binding relationship exists between the mobile terminal and the SIM card is obtained.

Preferably, when the mobile terminal sends the first IMEI to the SIM card, the step that it is authenticated, according to the encrypted data, whether the mobile terminal is capable of initializing the SIM card and the authentication result is obtained may correspondingly include the steps as follows.

A random number is generated according to the first IMEI.

Encryption calculation is performed on the random number by a predetermined encryption algorithm and authenticated data is obtained.

It is compared whether the encrypted data matches with the authenticated data and the authentication result is obtained.

In a second aspect, according to an embodiment of the present disclosure, a method for network locking of a mobile terminal is provided, which may be applied to a mobile terminal and may include the steps as follows.

Encrypted data used to authenticate whether the mobile terminal is capable of initializing a SIM card is sent to the SIM card.

An authentication result, returned by the SIM card and used to indicate whether the mobile terminal is capable of initializing the SIM card, is received.

When the authentication result indicates that the SIM card cannot be initialized, initialization of the SIM card is prohibited.

Preferably, the method may further include the steps as follows.

A first IMEI of the mobile terminal is sent to the SIM card, wherein the first IMEI is configured to judge whether a binding relationship exists between the mobile terminal and the SIM card.

A random number returned by the SIM card is received.

Correspondingly, the step that the encrypted data used to authenticate whether the mobile terminal is capable of initializing the SIM card is sent to the SIM card may include the steps as follows.

It is determined whether a length of the random number matches with a preset length, and a determination result is obtained.

If the determination result indicates that the length of the random number matches with the preset length, encryption calculation is performed on the random number according to a preset encryption algorithm and the encrypted data is obtained.

The encrypted data is sent to the SIM card.

In a third aspect, according to an embodiment of the present disclosure, a device for card locking of a mobile terminal is provided, which may be applied to a SIM card and may include a first receiving unit, an authentication unit and a first return unit, wherein the first receiving unit is configured to receive encrypted data sent by a mobile terminal;

the authentication unit is configured to authenticate, according to the encrypted data, whether the mobile terminal is capable of initializing the SIM card, and obtain an authentication result; and the first return unit is configured to return the authentication result to the mobile terminal.

Preferably, the device may further include a second receiving unit, a judgment unit, a generation unit and a second return unit, wherein the second receiving unit is configured to receive a first IMEI sent by the mobile terminal;

the judgment unit is configured to judge, according to the first IMEI, whether a binding relationship exists between the mobile terminal and the SIM card, and obtain a judgment result;

the generation unit is configured to generate a random number according to the first IMEI; and the second return unit is configured to return to the mobile terminal both the judgment result, indicating that the binding relationship exists between the mobile terminal and the SIM card, and the random number.

Preferably, the judgment unit may be specifically configured to:

determine, when a second IMEI is pre-stored in the SIM card, whether the received first IMEI matches with the second IMEI and obtain a determination result;

obtain, when the determination result indicates that the first IMEI matches with the second IMEI, the judgment result indicating that the binding relationship exists between the mobile terminal and the SIM card; and record, when the second IMEI is pre-stored in the SIM card, the first IMEI to complete binding between the SIM card and the mobile terminal, and obtain the judgment result indicating that the binding relationship exists between the mobile terminal and the SIM card.

Preferably, the authentication unit may include a first encryption module and a comparison module, wherein the first encryption module is configured to perform encryption calculation on the random number according to a predetermined encryption algorithm and obtain authenticated data; and the comparison module is configured to compare whether the encrypted data matches with the authenticated data and obtain the authentication result.

In a fourth aspect, according to an embodiment of the present disclosure, a device for network locking of a mobile terminal is provided, which may be applied to a mobile terminal and may include a first sending unit, a third receiving unit and a prohibition unit, wherein the first sending unit is configured to send encrypted data used to authenticate whether the mobile terminal is capable of initializing a SIM card to the SIM card;

the third receiving unit is configured to receive an authentication result, which is returned by the SIM card and indicates whether the mobile terminal is capable of initializing the SIM card; and the prohibition unit is configured to prohibit, when the authentication result indicates that the SIM card cannot be initialized, initialization of the SIM card.

Preferably, the device may further include a second sending unit and a fourth receiving unit, wherein the second sending unit is configured to send a first IMEI of the mobile terminal to the SIM card, the first IMEI being used to judge whether a binding relationship exists between the mobile terminal and the SIM card; and the fourth receiving unit is configured to receive a random number returned by the SIM card.

Correspondingly, the first sending unit may include a determination module, a second encryption module and a sending module, wherein the determination module is configured to determine whether a length of the random number matches with a preset length, and obtain a determination result;

the second encryption module is configured to perform, when the determination result indicates that the length of the random number matches with the preset length, encryption calculation on the random number according to a preset encryption algorithm and obtain the encrypted data; and the sending module is configured to send the encrypted data to the SIM card, the encrypted data being used to authenticate whether the mobile terminal is capable of initializing the SIM card.

In a fifth aspect, according to an embodiment of the present disclosure, a SIM card is provided, which may include: a SIM card file system and a card locking device, wherein the SIM card file system is configured to initialize information of the SIM card; and the card locking device includes a first receiving unit, an authentication unit and a first return unit, the first receiving unit being configured to receive encrypted data from a mobile terminal, the authentication unit being configured to authenticate, according to the encrypted data, whether the mobile terminal is capable of initializing the SIM card, and obtain an authentication result, and the first return unit being configured to return the authentication result to the mobile terminal.

In a sixth aspect, according to an embodiment of the present disclosure, a mobile terminal is provided, which may include: a SIM card initialization system and a network locking device, wherein the SIM card initialization system is configured to read, from a SIM card file system, information for initializing a SIM card, and initialize the SIM card; and the network locking device includes a first sending unit, a third receiving unit and a prohibition unit, the first sending unit being configured to send encrypted data used to authenticate whether the mobile terminal is capable of initializing a SIM card to the SIM card, the third receiving unit being configured to receive an authentication result which is returned by the SIM card and indicates whether the mobile terminal is capable of initializing the SIM card, and the prohibition unit being configured to, when the authentication result indicates that the SIM card cannot be initialized, prohibit the SIM card initialization system from reading the information for initializing the SIM card from the SIM card file system, and initialize the SIM card.

In a seventh aspect, according to an embodiment of the present disclosure, a computer storage medium is also provided. Computer executable instructions may be stored in the computer storage medium and may be configured to execute the method for card locking of a mobile terminal and/or the method for network locking of a mobile terminal, as described above.

In the embodiments of the present disclosure, encrypted data is sent to a SIM card by a mobile terminal, it is authenticated whether the mobile terminal can initialize the SIM card; when an authentication result indicates that the mobile terminal cannot initialize the SIM card, the mobile terminal is prohibited from initializing the SIM card, so that a network communication module of the mobile terminal cannot be used normally, thereby achieving network locking; and in addition, additionally-stored network locking parameters may be not used in a process of judging whether to perform network locking on the mobile terminal, thereby avoiding the situation that network locking of the mobile terminal can be cracked by modifying the network locking parameters, improving the security of network locking of the mobile terminal, and protecting benefits of operators.

BRIEF DESCRIPTION OF THE DRAWINGS

In order to illustrate the technical solutions in the embodiments of the present disclosure and the traditional art more clearly, drawings needed in the embodiments or the traditional art will be introduced simply. Obviously, the drawings described below illustrate some of the embodiments of the present disclosure. Those skilled in the art may also obtain other drawings according to these drawings with no creative work.

FIG. 1-2 is a flow diagram 2 of a method for card locking of a mobile terminal according to an embodiment of the present disclosure;

FIG. 1-3 is a flow diagram of Step 101 in a method for card locking of a mobile terminal according to an embodiment of the present disclosure;

FIG. 2-1 is a flow diagram 1 of a method for network locking of a mobile terminal according to an embodiment of the present disclosure;

FIG. 2-2 is a flow diagram 2 of a method for network locking of a mobile terminal according to an embodiment of the present disclosure;

FIG. 3-1 is a simple flow diagram of a network/card locking method for a mobile terminal according to an embodiment of the present disclosure;

FIG. 3-2 is a detailed flow diagram of a network/card locking method for a mobile terminal according to an embodiment of the present disclosure;

FIG. 4-1 is a schematic diagram 1 of the composition structure of a device for card locking of a mobile terminal according to an embodiment of the present disclosure;

FIG. 4-2 is a schematic diagram 2 of the composition structure of a device for card locking of a mobile terminal according to an embodiment of the present disclosure;

FIG. 4-3 is a schematic diagram of the composition structure of an authentication unit in a device for card locking of a mobile terminal according to an embodiment of the present disclosure;

FIG. 5-1 is a schematic diagram 1 of the composition structure of a device for network locking of a mobile terminal according to an embodiment of the present disclosure;

FIG. 5-2 is a schematic diagram 2 of the composition structure of a device for network locking of a mobile terminal according to an embodiment of the present disclosure;

FIG. 6-1 is a schematic diagram 1 of the composition structure of a SIM card according to an embodiment of the present disclosure;

FIG. 6-2 is a schematic diagram 2 of the composition structure of a SIM card according to an embodiment of the present disclosure;

FIG. 7-1 is a schematic diagram 1 of the composition structure of a mobile terminal according to an embodiment of the present disclosure;

FIG. 7-2 is a schematic diagram 2 of the composition structure of a mobile terminal according to an embodiment of the present disclosure.

DETAILED DESCRIPTION

In order to make the aims, technical solutions and advantages of the embodiments of the present disclosure clearer, the technical solutions in the embodiments of the present disclosure will be described clearly and completely below together with the drawings in the embodiments of the present disclosure. Obviously, the described embodiments are some of the embodiments of the present disclosure, not all of the embodiments. On the basis of the embodiments of the present disclosure, all other embodiments obtained with no creative work of those skilled in the art shall fall within the protective scope of the present disclosure.

Figure 1:
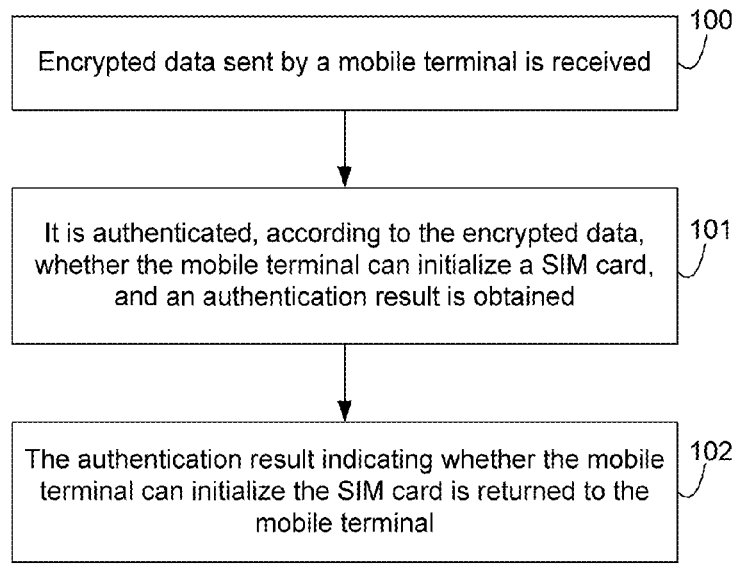
FIG. 1-1 is a flow diagram 1 of a method for card locking of a mobile terminal according to an embodiment of the present disclosure.

FIG. 1-1 illustrates a flow of a method for card locking of a mobile terminal according to an embodiment of the present disclosure. The method is applied to a SIM card, and includes the steps as follows.

Step 100: Encrypted data sent by a mobile terminal is received.

Step 101: It is authenticated, according to the encrypted data, whether the mobile terminal is capable of initializing the SIM card, and an authentication result is obtained.

Here, the authentication result is used to indicate whether the mobile terminal can initialize the SIM card.

Step 102: The authentication result indicating whether the mobile terminal is capable of initializing the SIM card is returned to the mobile terminal.

Here, in a condition that the authentication result indicates that the mobile terminal cannot initialize the SIM card, the mobile terminal is prohibited from initializing the SIM card.

According to the above operations, when the authentication result indicates that the mobile terminal cannot initialize the SIM card, the mobile terminal is prohibited from initializing the SIM card, so that a network communication module of the mobile terminal cannot be normally used, thereby realize network locking.

In an actual implementation of the method for card locking of a mobile terminal, data will be encrypted each time before the SIM card authenticates the mobile terminal, when authentication of the mobile terminal is obviously not passed (for example, the mobile terminal is completely unmatched with the SIM card), a network locking operation cannot be directly executed for the reason that it is determined that any one of the SIM card or the mobile terminal does not match with an appointment of an operator, therefore, data have to be encrypted continuously to form encrypted data, the encrypted data is then compared with authenticated data in the SIM card, and a conclusion about whether to lock network can be obtained only after the comparison is completed, thereby increasing the processing flow of network locking.

Figures 1, 2:
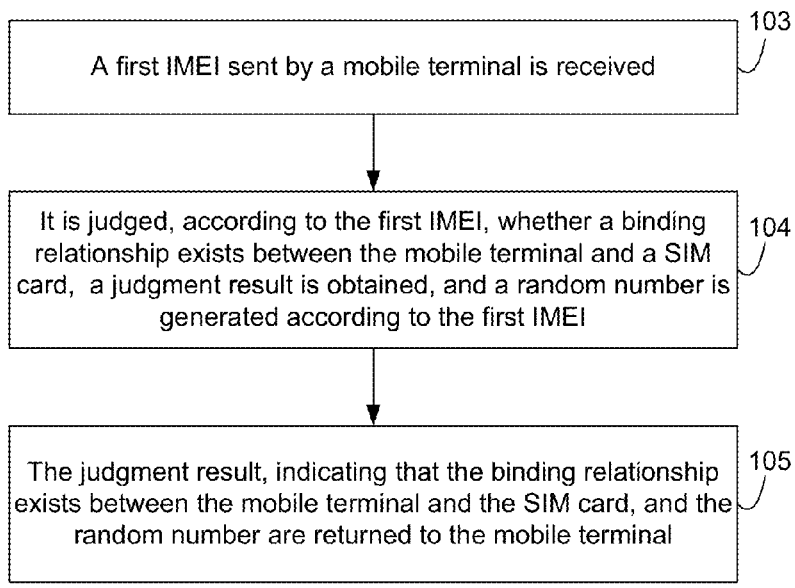

In this embodiment, as shown in FIG. 1-2, the method further includes the steps as follows.

Step 103: A first IMEI sent by the mobile terminal is received.

Step 104: It is judged, according to the first IMEI, whether a binding relationship exists between the mobile terminal and the SIM card, a judgment result is obtained, and a random number is generated according to the first IMEI.

Here, the judgment result is used to indicate that the binding relationship exists between the mobile terminal and the SIM card.

Step 105: Both the random number and the judgment result indicating that the binding relationship exists between the mobile terminal and the SIM card are returned to the mobile terminal.

According to the above operations, before the SIM card encrypts the data, it is judged whether the binding relationship exists between the mobile terminal and the SIM card according to the received first IMEI; and when the binding relationship does not exist between the mobile terminal and the SIM card, the mobile terminal may not be authenticated, and the network locking operation on the mobile terminal is directly executed, thereby simplifying the processing flow of network locking.

Specifically, the step that it is judged, according to the first IMEI, whether the binding relationship exists between the mobile terminal and the SIM card and the judgment result is obtained specifically includes the steps as follows.

If a second IMEI is pre-stored in the SIM card, it is judged whether the received first IMEI matches with the second IMEI.

Here, when the first IMEI matches with the second IMEI, the judgment result indicating that the binding relationship exists between the mobile terminal and the SIM card is obtained; and when the first IMEI does not match with the second IMEI, the SIM card determines that the mobile terminal is illegal, and returns a status value indicative of error to the mobile terminal.

If the second IMEI is not pre-stored in the SIM card, the SIM card stores the first IMEI as a mark indicative the binding with the mobile terminal so as to complete the binding between the SIM card and the mobile terminal, and the judgment result indicating that the binding relationship exists between the mobile terminal and the SIM card is obtained.

If data sent by the mobile terminal is compared directly in an authentication process, the authenticated data is probably leaked in the case of external monitoring, thereby causing the failure of the method for card locking of a mobile terminal.

Figures 1, 2, 3:
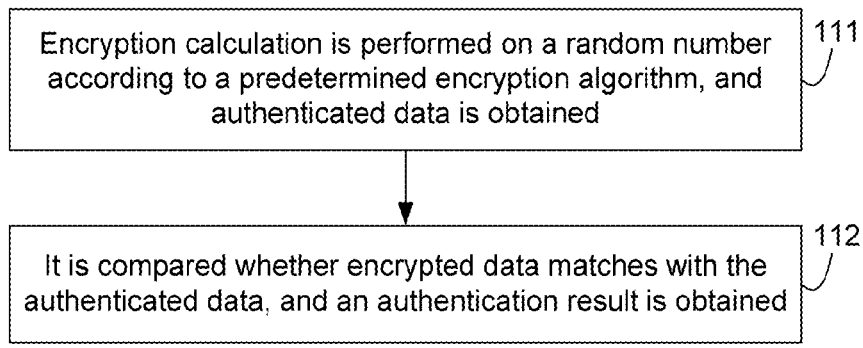
Figures 1, 2:
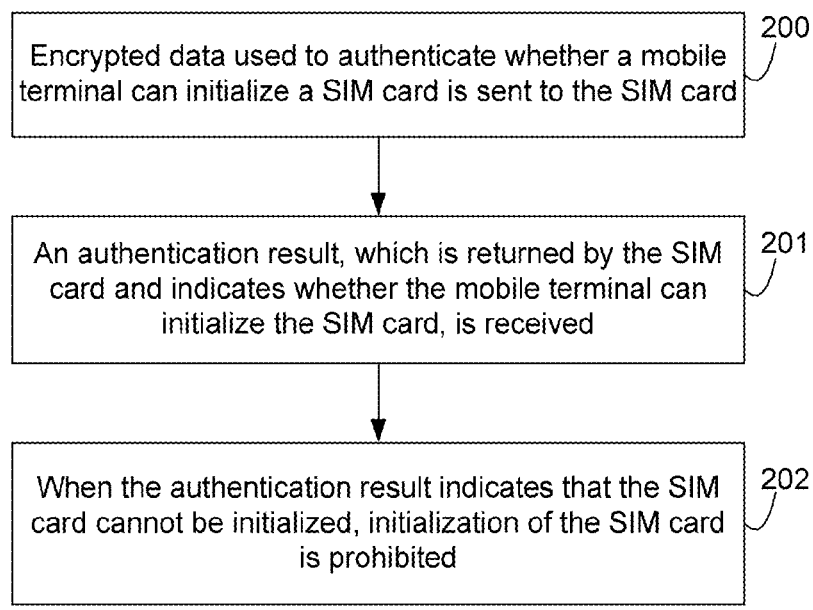
Figure 2:
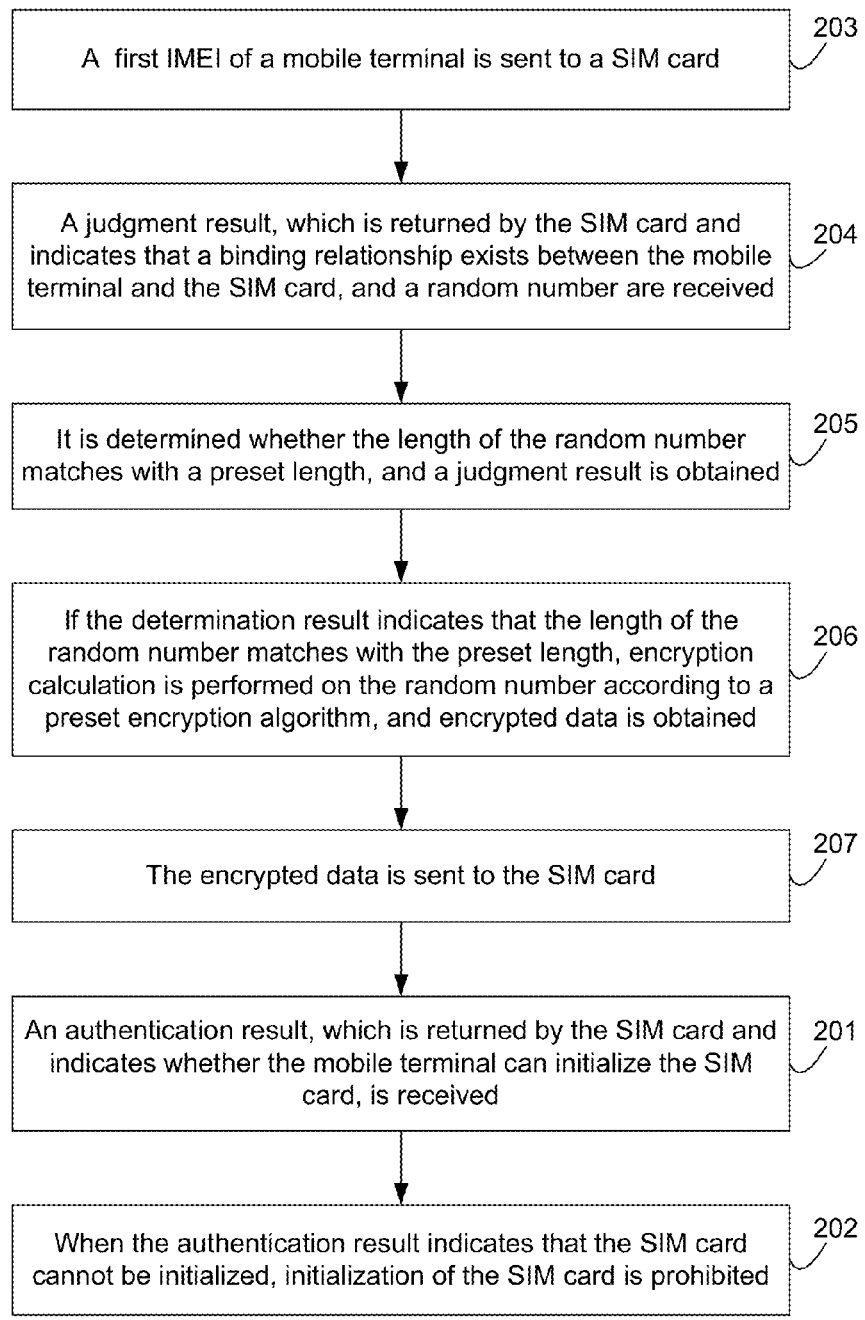
Figures 1, 3:
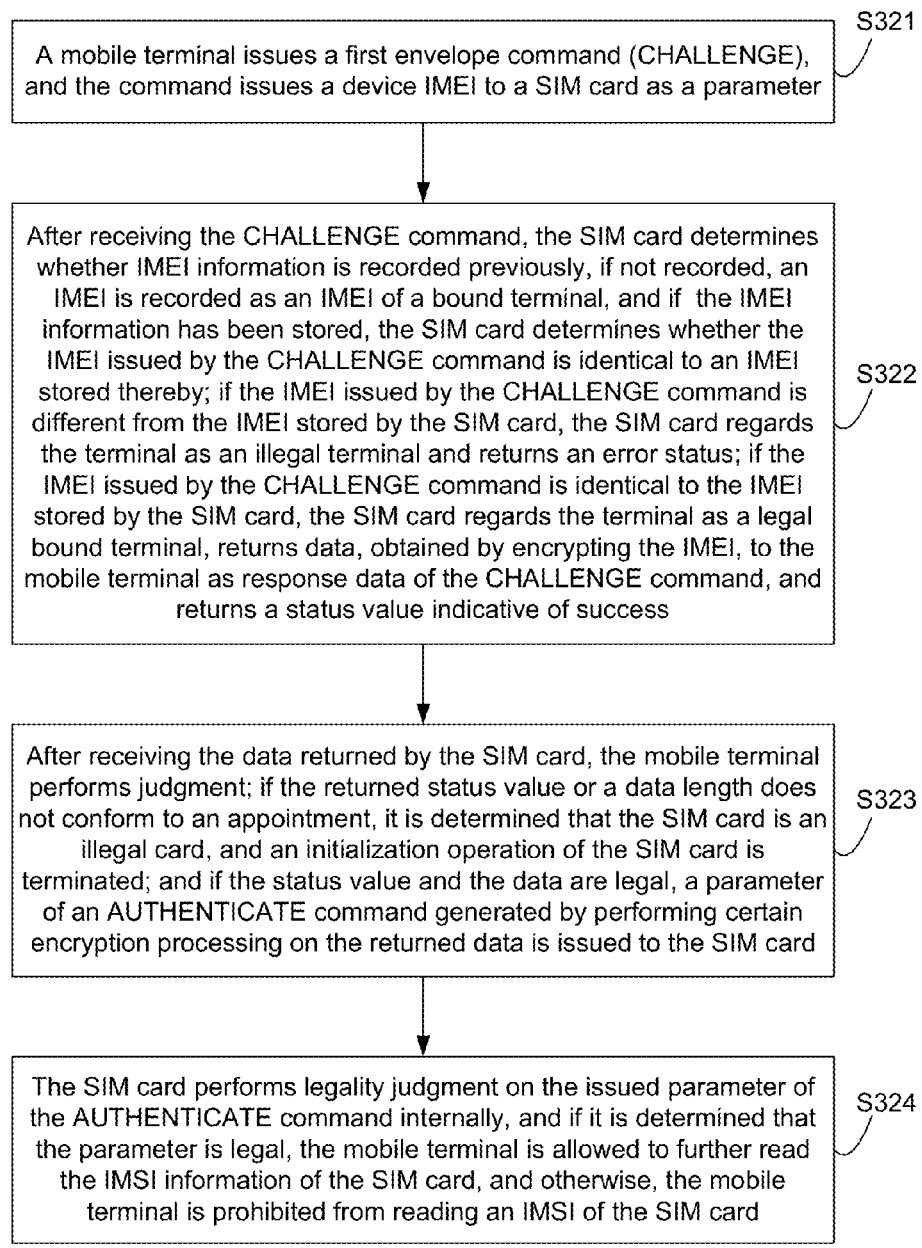
Figures 2, 3:
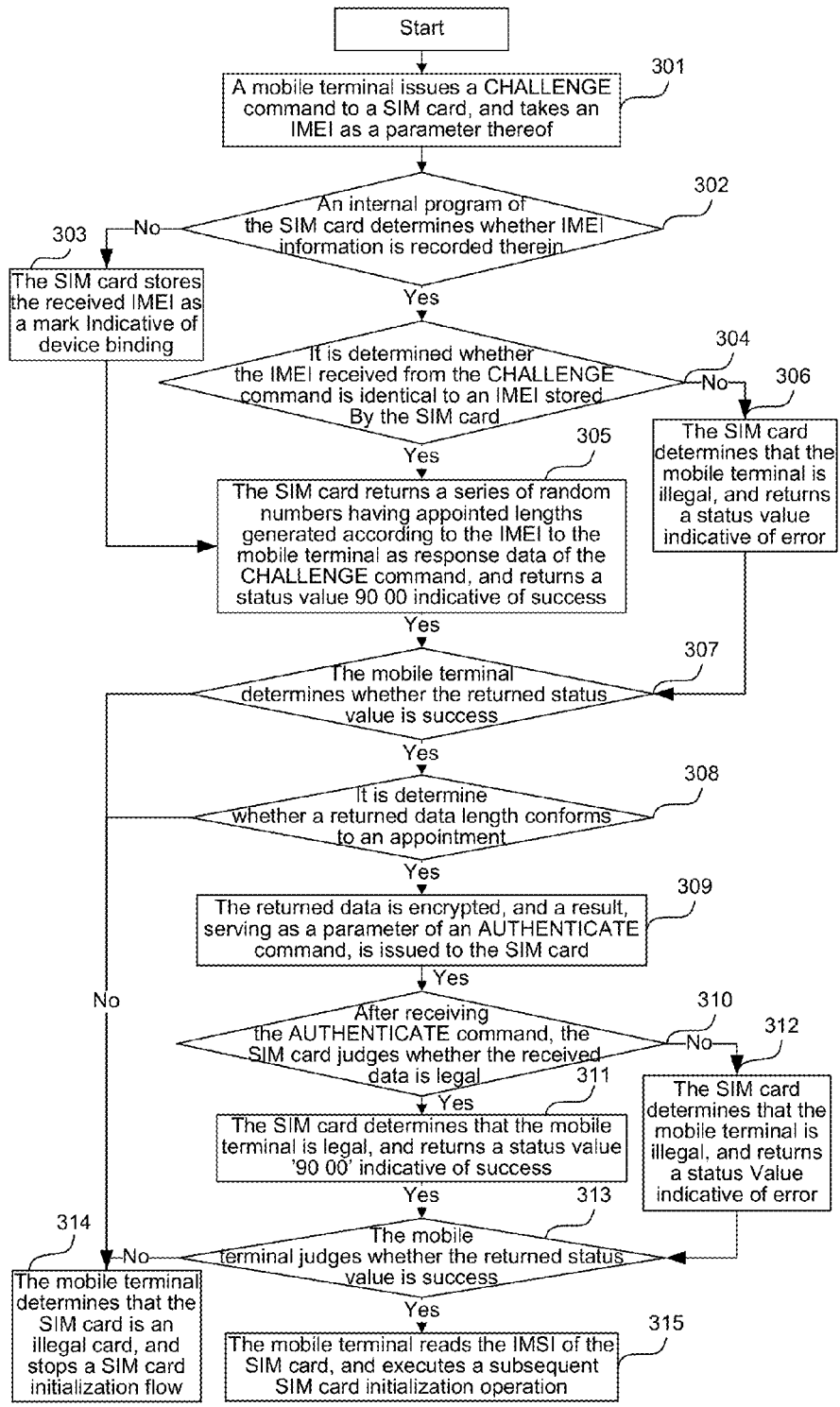

Specifically, when the mobile terminal sends the first IMEI to the SIM card, as shown in FIG. 1-3, Step 101 specifically includes the steps as follows.

Step 111: Encryption calculation is performed on a random number by a predetermined encryption algorithm and authenticated data is obtained.

Here, the random number is generated according to the first IMEI.

Step 112: It is compared whether the encrypted data matches with the authenticated data and an authentication result is obtained.

Here, if the authenticated data does not match with the encrypted data, an authentication result indicating that the mobile terminal cannot initialize the SIM card is obtained.

According to the above operations, the encrypted data is authenticated, therefore, even if the data is externally monitored in the authentication process, data adopted in the authentication cannot be leaked, thereby ensuring the effect of the method for card locking of a mobile terminal.

At a mobile terminal side, in correspondence to the method for card locking of a mobile terminal, which is applied to the SIM card side, as shown in FIG. 2-1, according to an embodiment of the present disclosure, a method for network locking of a mobile terminal is also proposed, which includes the steps as follows.

Step 200: Encrypted data used to authenticate whether the mobile terminal can initialize a SIM card is sent to the SIM card.

Step 201: An authentication result, which is returned by the SIM card and indicates whether the mobile terminal can initialize the SIM card, is received.

Step 202: When the authentication result indicates that the SIM card cannot be initialized, initialization of the SIM card is prohibited.

Specifically, when the authentication result indicates that the mobile terminal cannot initialize the SIM card, the mobile terminal is prohibited from initializing the SIM card.

Furthermore, the mobile terminal also sends a first IMEI to the SIM card, such that the SIM card judges whether a binding relationship exists between the mobile terminal and the SIM card. In this case, as shown in FIG. 2-2, the card locking method at the mobile terminal side includes the steps as follows.

Step 203: The first IMEI of the mobile terminal is sent to the SIM card.

Here, the first IMEI may be carried in a CHALLENGE command, and the first IMEI is used to judge whether the binding relationship exists between the mobile terminal and the SIM card.

Step 204: Both a random number and a judgment result, which is returned by the SIM card and indicates that the binding relationship exists between the mobile terminal and the SIM card are received.

Here, the random number is generated by the SIM card according to the first IMEI.

In the above method for network locking of a mobile terminal, the random number is encrypted by the mobile terminal before authentication, and when the received random number has an obvious problem, a network locking operation cannot be directly executed for the reason that it is determined that any one of the SIM card or the mobile terminal does not match with an appointment of an operator, instead, the random number has to be encrypted again to form encrypted data, the encrypted data is then sent to the SIM card and compared with authenticated data in the SIM card, and after the comparison is completed, a conclusion about whether to lock network can be obtained, thereby increasing the processing flow of network locking.

Step 205: It is determined whether the length of the random number matches with a preset length, and a determination result is obtained.

Step 206: If the determination result indicates that the length of the random number matches with the preset length, encryption calculation is performed on the random number according to a preset encryption algorithm, and the encrypted data is obtained.

Step 207: The encrypted data is sent to the SIM card.

Here, when the random number sent by the SIM card is received, Step 205 to Step 207 are steps specifically included by Step 200.

Here, the encrypted data is used to authenticate whether the mobile terminal initialize the SIM card.

Step 201: An authentication result, which is returned by the SIM card and indicates whether the mobile terminal can initialize the SIM card, is received.

Step 202: When the authentication result indicates that the SIM card cannot be initialized, initialization of the SIM card is prohibited.

By means of the above operations, before encryption calculation is performed on the random number, it is determined whether the length of the random number matches with the preset length, and if the length of the random number does not match with the preset length, encryption calculation may be not performed on the random number, and the network locking operation on the mobile terminal is directly executed, thereby simplifying the processing flow of network locking.

A mobile terminal network/card locking method is further described below according to an embodiment.

The network/card locking method for a mobile terminal, proposed by this embodiment, is to add authentication protection to an IMSI file inside an SIM card, and a software terminal and the SIM card appoint a specific envelope command, defined by two non-3GPP standard protocols, for authentication. An IMSI authentication flow is added in a SIM card initialization process of a mobile terminal. Specifically, during the initialization stage of the SIM card, before IMSI information is read, the mobile terminal issues a first envelop command (named CHALLENGE in order to facilitate expression), wherein, according to the command, a device IMEI, as a parameter, is issued to the SIM card, and if the SIM card does not record IMEI information previously, the IMEI will be recorded as an IMEI of a bound terminal. If IMEI information have been stored, the SIM card will determine whether the IMEI issued by the CHALLENGE command is identical to an IMEI stored in the SIM card, and if identical, the SIM card regards the terminal as a legal terminal and returns to the mobile terminal data which is obtained by encrypting the IMEI and serves as response data of the CHALLENGE command. After receiving return data of the CHALLENGE command from the SIM card, the mobile terminal performs certain encryption processing to generate a parameter of a second envelop command (named AUTHENTICATE in order to facilitate expression) and issues the parameter to the SIM card, the SIM card performs legality judgment on the issued parameter internally; if it is determined that the parameter is legal, the mobile terminal is allowed to further read the IMSI information about the SIM card, otherwise, the mobile terminal is prohibited from reading an IMSI of the SIM card. As the IMSI is a file which must be read in the SIM card initialization process, once the IMSI cannot be read, an initialization flow of a mobile device will be ended, thereby realizing network locking.

Specifically, SIM is an abbreviation of Subscriber Identity Module, and represents a subscriber identity module. It is, actually, a smart card internally containing a large-scale integrated circuit and configured to register data and information of subscriber identities.

STK (SIM TOOL KIT) is an abbreviation of a Subscriber Identity Module Application Toolkit, which may be interpreted as a group of commands for developing value added services. A small programming language allows a SIM based on a smart card to run the application software of the SIM.

An envelope command is a command sent to an SIM card by a mobile terminal in an STK function.

FIG. 3-1 shows a simple flow diagram of a network/card locking method for a mobile terminal. The method includes the steps as follows.

Step S321: A mobile terminal issues a first envelope command (CHALLENGE) to command to issue a device IMEI as a parameter to a SIM card.

Here, Step S321 is carried out at the initialization stage of a SIM card before IMSI information is read.

Step S322: After receiving the CHALLENGE command, the SIM card determine whether IMEI information is recorded previously; if not recorded, an IMEI is recorded as an IMEI of a bound terminal; if having stored the IMEI information, the SIM card determines whether the IMEI issued by the CHALLENGE command is identical to an IMEI stored by the SIM card; if the IMEI issued by the CHALLENGE command is different from the IMEI stored by the SIM card, the SIM card regards the terminal as an illegal terminal and returns an error status; if the IMEI issued by the CHALLENGE command is identical to the IMEI stored by the SIM card, the SIM card regards the terminal as a legal bound terminal, returns data, obtained by encrypting the IMEI, to the mobile terminal as response data of the CHALLENGE command, and returns a status value indicative of success.

Step S323: After receiving the data returned by the SIM card, the mobile terminal performs judgment; if the returned status value or a data length does not conform to an appointment, it is determined that the SIM card is an illegal card, and the initialization of the SIM card is terminated; and if the status value and the data are legal, a parameter of an AUTHENTICATE command generated by performing certain encryption processing on the returned data is issued to the SIM card.

Step S324: The SIM card performs legality judgment on the issued parameter of the AUTHENTICATE command internally; if it is determined that the parameter is legal, the mobile terminal is allowed to further read the IMSI information of the SIM card, and otherwise, the mobile terminal is prohibited from reading an IMSI of the SIM card.

In order to make a network locking function of the present disclosure become effective, envelope command authentication protection may be added to an IMSI file inside the SIM card of an operator, that is, only after the mobile terminal and the SIM card perform legal envelope command interaction, a file system of the SIM card can be normally accessed. Otherwise, when any mobile terminal issues a command to read an IMSI, the SIM card will return a status value indicative of error, and the SIM card cannot be normally used.

Secondly, the mobile terminal may modify a code at the initialization stage of the SIM card, and before important parameters such as the IMSI are read for the first time, an operation of envelope command authentication on the SIM card is added. Only when the authentication is passed, the subsequent initialization of the SIM card is allowed. As a legal returned result and a command detail for envelope command authentication are appointed with the operator and there is no definition in a 3GPP protocol, SIM cards of other operators cannot make a response, conforming to an appointment, to an envelope authentication command issued by the mobile terminal. The mobile terminal may determine the SIM card as an illegal card accordingly, so as to terminate the initialization of the SIM card. As all other modules such as a network finder of the mobile terminal depend on the accomplishment of initialization of the SIM card, once the initialization of the SIM card is ended, all other modules cannot be normally used, thereby achieving network locking.

Specifically, FIG. 3-2 shows a detailed flow of a network/card locking method for a mobile terminal. The method includes the steps as follows.

Step 301: A mobile terminal issues a CHALLENGE command to a SIM card, and takes an IMEI as a parameter thereof.

Step 302: An internal program of the SIM card determines whether IMEI information is recorded therein; if the SIM card has not stored the IMEI information previously, Step 303 is executed, and if the SIM card has stored the IMEI information previously, Step 304 is executed.

Step 303: The SIM card stores the received IMEI as a mark indicative of device binding, and then Step 305 is executed.

Step 304: It is determined whether the IMEI received from the CHALLENGE command is identical to an IMEI stored by the SIM card; if identical, Step 305 is executed, and otherwise, Step 306 is executed.

Step 305: The SIM card returns a series of random numbers having appointed lengths generated according to the IMEI to the mobile terminal as response data of the CHALLENGE command, and returns a status value 90 00 indicative of success.

Step 306: The SIM card determines that the mobile terminal is illegal, and returns a status value indicative of error.

Step 307: The mobile terminal determines whether the returned status value is success; if the returned status value is success, Step 308 is executed, and otherwise, Step 314 is executed.

Step 308: It is determined whether a returned data length conforms to an appointment; if conforming, Step 309 is executed, and otherwise, Step 314 is executed.

Step 309: Appointed encryption processing is performed on the returned data, and a result, serving as a parameter of an AUTHENTICATE command, is issued to the SIM card.

Step 310: After receiving the AUTHENTICATE command, the SIM card compares the received AUTHENTICATE command with its own calculation result and determines whether the received data is legal; if legal, Step 311 is executed, and otherwise, Step 312 is executed.

Step 311: The SIM card determines that the mobile terminal is legal, and returns a status value indicative of success, and Step 313 is executed.

Step 312: The SIM card determines that the mobile terminal is illegal, and returns a status value indicative of error, and Step 313 is executed.

Step 313: After receiving the status value returned by the SIM card, the mobile terminal determines whether the status value is success; if the returned status value is success, Step 315 is executed, and otherwise, Step 314 is executed.

Step 314: The mobile terminal determines that the SIM card is an illegal card, and stops the initialization flow of the SIM card.

Step 315: The mobile terminal determines that the SIM card is a legal card, reads information such as the IMSI of the SIM card, and executes the subsequent initialization of the SIM card.

Based on the above descriptions, according to the network/card locking method for a mobile terminal provided in the embodiments of the present disclosure, according to the encrypted data sent to a SIM card by the mobile terminal, it is authenticated whether the mobile terminal can initialize the SIM card; when an authentication result indicates that the mobile terminal cannot initialize the SIM card, the mobile terminal is prohibited from initializing the SIM card, so that a network communication module of the mobile terminal cannot be normally used, thereby realizing network locking; and in addition, additionally-stored network locking parameters may be not used in a process of judging whether to perform network locking on the mobile terminal, thereby avoiding the situation that network locking of the mobile terminal may be cracked by modifying the network locking parameters, improving the security of network locking of the mobile terminal, and protecting benefits of operators.

Figures 1, 4:
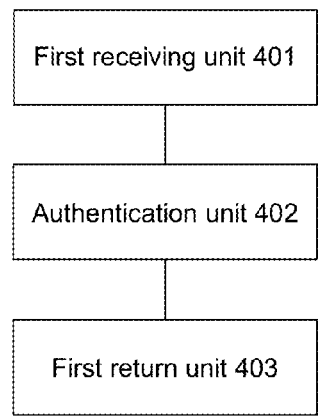
Figures 2, 4:
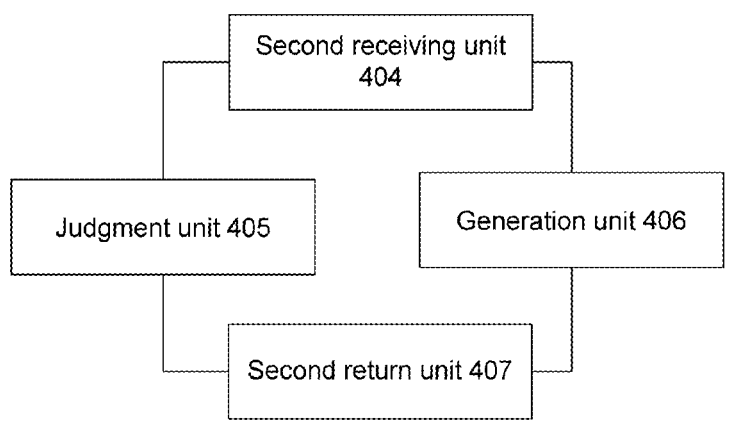
Figures 3, 4:
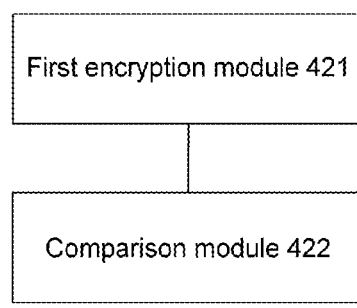

FIG. 4-1 shows a diagram of composition structure of an embodiment of a device for card locking of a mobile terminal. The device is applied to a SIM card, and includes a first receiving unit 401, an authentication unit 402 and a first return unit 403, wherein the first receiving unit 401 is configured to receive encrypted data sent by a mobile terminal;

the authentication unit 402 is configured to authenticate, according to the encrypted data, whether the mobile terminal can initialize the SIM card and obtain an authentication result; and the first return unit 403 is configured to return the authentication result, indicating whether the mobile terminal can initialize the SIM card, to the mobile terminal.

Here, if the authentication result indicates that the mobile terminal cannot initialize the SIM card, the mobile terminal is prohibited from initializing the SIM card.

Furthermore, as shown in FIG. 4-2, the device further includes a second receiving unit 404, a judgment unit 405, a generation unit 406 and a second return unit 407, wherein the second receiving unit 404 is configured to receive a first IMEI sent by the mobile terminal;

the judgment unit 405 is configured to judge, according to the first IMEI, whether a binding relationship exists between the mobile terminal and the SIM card, and obtain a judgment result;

the generation unit 406 is configured to generate a random number according to the first IMEI; and the second return unit 407 is configured to return to the mobile terminal both the random number and the judgment result indicating that the binding relationship exists between the mobile terminal and the SIM card.

Here, the random number is generated by the SIM card according to the first IMEI.

Furthermore, the judgment unit is specifically configured to:

determine, when a second IMEI is pre-stored in the SIM card, whether the received first IMEI matches with the second IMEI;

obtain, when the first IMEI matches with the second IMEI, the judgment result indicating that the binding relationship exists between the mobile terminal and the SIM card; and record, when the second IMEI is pre-stored in the SIM card, the first IMEI to complete binding between the SIM card and the mobile terminal, and obtain the judgment result indicating that the binding relationship exists between the mobile terminal and the SIM card.

Furthermore, as shown in FIG. 4-3, the authentication unit 402 includes a first encryption module 421 and a comparison module 422, wherein the first encryption module 421 is configured to perform encryption calculation on the random number according to a predetermined encryption algorithm, and obtain authenticated data; and the comparison module 422 is configured to compare whether the encrypted data matches with the authenticated data, and obtain the authentication result.

Here, if the authentication result displays that the authenticated data does not match with the encrypted data, the authentication result indicates that the mobile terminal cannot initialize the SIM card is obtained.

Functions and a processing flow of the device for card locking of a mobile terminal provided in this embodiment may refer to the flow of the embodiment for the method for card locking of a mobile terminal provided above, which will not be elaborated herein.

Figures 1, 5:
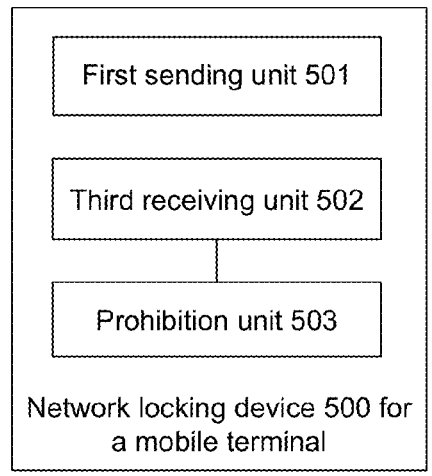
Figures 2, 5:
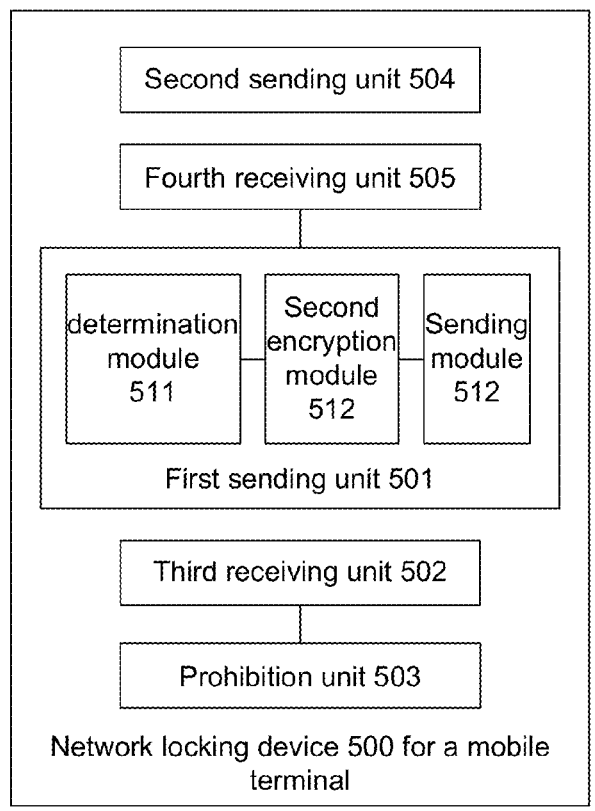

FIG. 5-1 shows a schematic diagram of the composition structure of an embodiment for a device for network locking of a mobile terminal. The device 500 for network locking of a mobile terminal is applied to a mobile terminal, and includes a first sending unit 501, a third receiving unit 502 and a prohibition unit 503, wherein the first sending unit 501 is configured to send encrypted data used to authenticate whether the mobile terminal can initialize a SIM card to the SIM card;

the third receiving unit 502 is configured to receive an authentication result which is returned by the SIM card and indicates whether the mobile terminal can initialize the SIM card; and the prohibition unit 503 is configured to prohibit initialization of the SIM card when the authentication result indicates that the SIM card cannot be initialized.

Furthermore, the mobile terminal also sends a first IMEI to the SIM card, such that the SIM card judges whether a binding relationship exists between the mobile terminal and the SIM card. In this case, as shown in FIG. 5-2, the device 500 for network locking of a mobile terminal includes a second sending unit 504, a fourth receiving unit 505, a first sending unit 501, a third receiving unit 502 and a prohibition unit 503, wherein the second sending unit 504 is configured to send the first IMEI of the mobile terminal to the SIM card, the first IMEI being used to judge whether a binding relationship exists between the mobile terminal and the SIM card; and the fourth receiving unit 505 is configured to receive, from the SIM card, a random number and a judgment result which indicates that the binding relationship exists between the mobile terminal and the SIM card, the random number being generated by the SIM card according to the first IMEI.

The first sending unit 501 includes a determination module 511, a second encryption module 512 and a sending module 513, wherein the determination module 511 is configured to determine whether the length of the random number matches with a preset length, and obtain a determination result;

the second encryption module 512 is configured to perform, when the determination result indicates that the length of the random number matches with the preset length, encryption calculation on the random number according to a preset encryption algorithm and obtain the encrypted data; and the sending module 513 is configured to send the encrypted data to the SIM card, the encrypted data being used to authenticate whether the mobile terminal can initialize the SIM card.

The third receiving unit 502 is configured to receive an authentication result which is returned by the SIM card and indicates whether the mobile terminal can initialize the SIM card.

The prohibition unit 503 is configured to prohibit initialization of the SIM card when the authentication result indicates that the SIM card cannot be initialized.

Functions and a processing flow of the device for network locking of a mobile terminal provided in this embodiment may refer to the flow of the embodiment for the method for network locking of a mobile terminal provided above, which will not be elaborated herein.

Figures 1, 6:
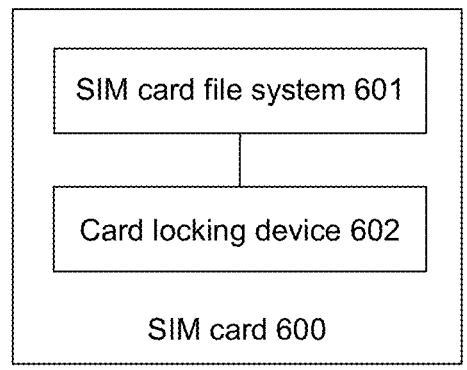
Figures 2, 6:
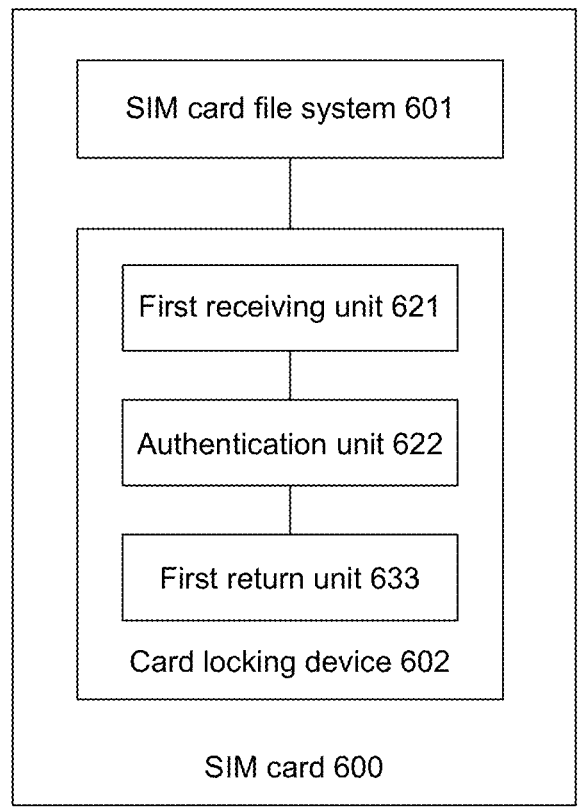

According to an embodiment of the present disclosure, a SIM card is also proposed. As shown in FIG. 6-1, the SIM card 600 includes: a SIM card file system 601 and a device for card locking of a mobile terminal (a card locking device for short) 602, wherein the SIM card file system 601 is configured to initialize information of the SIM card; and the card locking device 602 is configured to: receive encrypted data from a mobile terminal; authenticate, according to the encrypted data, whether the mobile terminal can initialize the SIM card, and obtain an authentication result; and return to the mobile terminal the authentication result indicating whether the mobile terminal can initialize the SIM card, wherein if the authentication result indicates that the mobile terminal cannot initialize the SIM card, the mobile terminal is prohibited from reading, from the SIM card file system, information for initializing the SIM card.

Specifically, the SIM card file system includes IMSI information.

Furthermore, as shown in FIG. 6-2, the card locking device 602 includes a first receiving unit 621, an authentication unit 622 and a first return unit 623, wherein the first receiving unit 621 is configured to receive encrypted data from a mobile terminal;

the authentication unit 622 is configured to authenticate, according to the encrypted data, whether the mobile terminal can initialize the SIM card, and obtain an authentication result; and the first return unit 623 is configured to return the authentication result, indicating whether the mobile terminal can initialize the SIM card, to the mobile terminal.

Here, when the authentication result indicates that the mobile terminal cannot initialize the SIM card, the mobile terminal is prohibited from reading, from the SIM card file system, information for initializing the SIM card.

Functions and a processing flow of the SIM card provided in this embodiment may refer to the flow of the embodiment for the method for card locking of a mobile terminal provided above, which will not be elaborated herein.

Figures 1, 7:
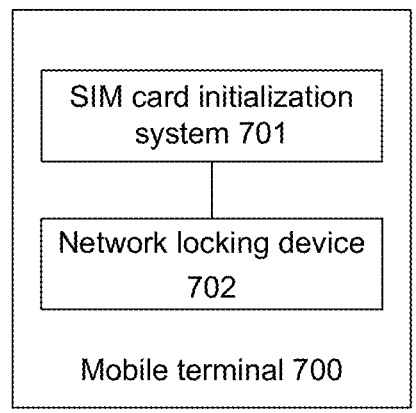
Figures 2, 7:
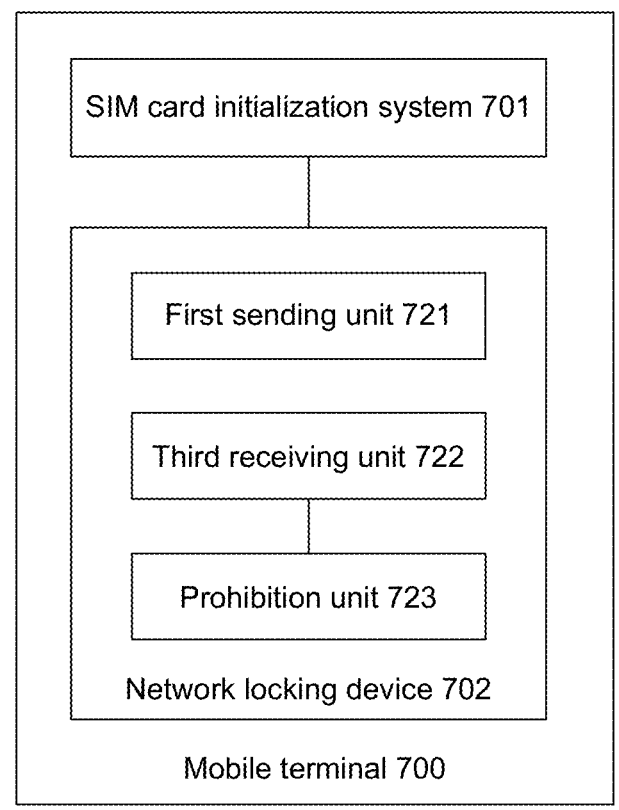

According to an embodiment of the present disclosure, a mobile terminal is also proposed. As shown in FIG. 7-1, the mobile terminal 700 includes: a SIM card initialization system 701 and a device for network locking of a mobile terminal (a network locking device for short) 702, wherein the SIM card initialization system 701 is configured to read, from a SIM card file system, information for initializing a SIM card, and initialize the SIM card; and the network locking device 702 is configured to: send encrypted data used to authenticate whether the mobile terminal can initialize a SIM card to the SIM card; and receive an authentication result which is returned by the SIM card and indicates whether the mobile terminal can initialize the SIM card, wherein when the authentication result indicates that the mobile terminal cannot initialize the SIM card, the SIM card initialization system is prohibited from reading information for initializing the SIM card from the SIM card file system, and the SIM card is initialized.

Furthermore, as shown in FIG. 7-2, the network locking device 702 includes a first sending unit 721, a third receiving unit 722 and a prohibition unit 723, wherein the first sending unit 721 is configured to send, to the SIM card, encrypted data used to authenticate whether the mobile terminal can initialize a SIM card;

the third receiving unit 722 is configured to receive an authentication result which is returned by the SIM card and indicates whether the mobile terminal can initialize the SIM card; and the prohibition unit 723 is configured to prohibit, when the authentication result indicates that the SIM card cannot be initialized, the SIM card initialization system from reading information for initializing the SIM card from the SIM card file system, and initialize the SIM card.

Functions and a processing flow of the mobile terminal provided in this embodiment may refer to the flow of the embodiment for the method for network locking of a mobile terminal provided above, which will not be elaborated herein.

A network/card locking device for a mobile terminal is further described below in an embodiment.

Figure 8:
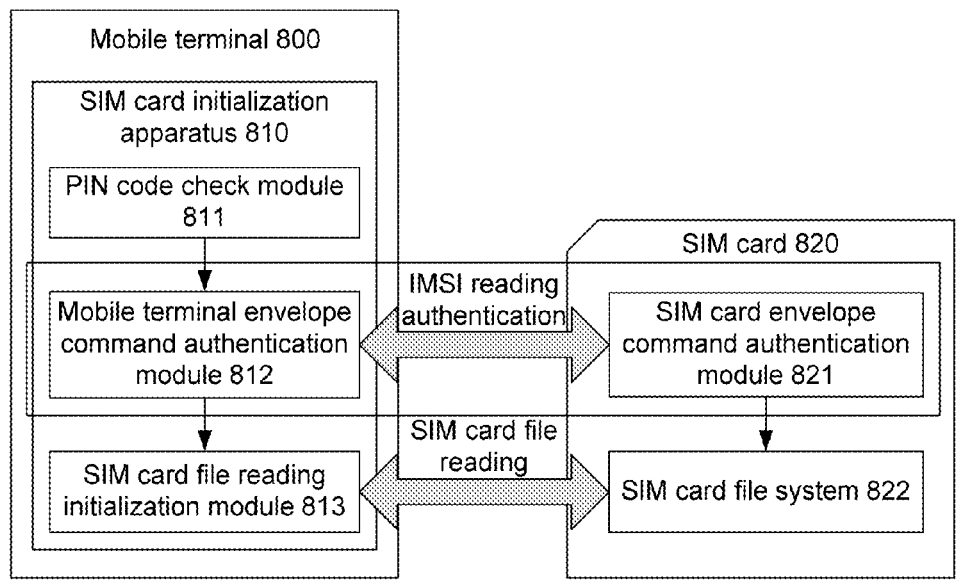
FIG. 8 is a schematic diagram of the composition structure of a network/card locking device for a mobile terminal according to an embodiment of the present disclosure.

As shown in FIG. 8, the network/card locking device for a mobile terminal in this embodiment includes a SIM card initialization apparatus 810 and a SIM card 820 located in a mobile terminal 800.

The SIM card initialization apparatus 810 includes a PIN code check module 811, a mobile terminal envelope command authentication module 812 and a SIM card file reading initialization module 813, wherein the PIN code check module 811 is configured to check, when a PIN code of the SIM card is enabled, the PIN code, and after checking of the PIN code is passed, the mobile terminal envelope command authentication module 812 executes subsequent operations;

the mobile terminal envelope command authentication module 812 is configured to issue an envelope command to execute an authentication operation, and parse and judge a return result from the SIM card; and the SIM card file reading initialization module 813 is configured to initialize the SIM card, read parameters, such as an IMSI, needed for running of a mobile device from a SIM card file system, and the SIM card file reading initialization module 813 is allowed to execute the operation only after the mobile terminal envelope command authentication module 812 determines that the SIM card is legal.

The SIM card 820 includes an envelope command authentication processing module 821 and a SIM card file system 822, wherein the envelope command authentication processing module 821 is in charge of giving a response to the envelope command issued by the mobile terminal; and the SIM card file system 822 is protected by the envelope command authentication processing module 821, and an access to IMSI information in the file system is allowed only when the envelope command authentication processing module 821 determines that the mobile terminal is legal.

Based on the above descriptions, according to the network/card locking device for a mobile terminal, the mobile terminal and the SIM card provided in the embodiments of the present disclosure, it is authenticated whether the mobile terminal can initialize the SIM card according to encrypted data sent to the SIM card by the mobile terminal; when an authentication result indicates that the mobile terminal cannot initialize the SIM card, the mobile terminal is prohibited from initializing the SIM card, so that a network communication module of the mobile terminal cannot be normally used, thereby achieving network locking; and in addition, additionally-stored network locking parameters may be not used in a process of judging whether to perform network locking on the mobile terminal, thereby avoiding the situation that network locking of the mobile terminal may be cracked by modifying the network locking parameters, improving the security of network locking of the mobile terminal, and protecting benefits of operators.

The first receiving unit, the authentication unit, the first return unit, the second receiving unit, the judgment unit, the generation unit and the second return unit in the device for card locking of a mobile terminal provided by the embodiment of the present disclosure as well as the first encryption module and the comparison module in the authentication unit may be implemented by a processor in the SIM card. The first sending unit, the third receiving unit, the prohibition unit, the second sending unit and the fourth receiving unit in the device for network locking of a mobile terminal provided by the embodiment of the present disclosure may be implemented by the processor in the SIM card. Certainly, the processor mentioned above may be implemented by a specific logical circuit. In a specific embodiment, the processor may be a Central Processing Unit (CPU), a Micro Processing Unit (MPU), a Digital Signal Processor (DSP), a Field Programmable Gate Array (FPGA) or the like.

In the embodiments of the present disclosure, if the method for card locking of a mobile terminal and/or the method for network locking of a mobile terminal are/is implemented in a form of a software function module and are/is sold or used as an independent product, the product may also be stored in a computer readable storage medium. Based on this understanding, the technical solutions of the embodiments of the present disclosure may be substantially embodied in a form of a software product, or parts contributing to the traditional art may be embodied in a form of a software product, and the computer software product is stored in a storage medium, including a plurality of instructions enabling a computer device which may be a personal computer, a server or a network device to execute all or some of the methods according to each embodiment of the present disclosure. The storage medium includes various media capable of storing program codes, such as a U disk, a mobile hard disk, a Read Only Memory (ROM), a magnetic disk or an optical disc. Thus, the embodiments of the present disclosure are not limited to combination of any specific hardware and software.

Correspondingly, according to an embodiment of the present disclosure, a computer storage medium is also provided. Computer executable instructions are stored in the computer storage medium and are configured to execute the method for card locking of a mobile terminal and/or the method for network locking of a mobile terminal, provided in each embodiment of the present disclosure.

It shall be noted that: each of the above embodiments is merely intended to illustrate the technical solutions of the present disclosure but does not limit the technical solutions; although the present disclosure is illustrated in detail with reference to each of the above embodiments, those skilled in the art shall understand that they can still modify the technical solutions recorded by each of the above embodiments or can equivalently replace some or all of the technical features; and these modifications or replacements do not make the essences of corresponding technical solutions depart from the scope of the technical solutions in each embodiment of the present disclosure.

INDUSTRIAL APPLICABILITY

In each embodiment provided by the present disclosure, it is authenticated whether the mobile terminal can initialize the SIM card according to encrypted data sent to a SIM card by a mobile terminal; when an authentication result indicates that the mobile terminal cannot initialize the SIM card, the mobile terminal is prohibited from initializing the SIM card, so that a network communication module of the mobile terminal cannot be normally used, thereby achieving network locking; and in addition, additionally-stored network locking parameters may be not used in a process of judging whether to perform network locking on the mobile terminal, thereby avoiding the situation that network locking of the mobile terminal may be cracked by modifying the network locking parameters, improving the security of network locking of the mobile terminal, and protecting benefits of operators.

What is claimed is:

1. A method for card locking of a mobile terminal, applied to a Subscriber Identity Module (SIM) card, the method comprising:
   receiving a first International Mobile Equipment Identification Number (IMEI) from the mobile terminal;
   judging, according to the first IMEI, whether a binding relationship exists between the mobile terminal and the SIM card, obtaining a judgment result, and generating a random number with a preset length according to the first IMEI; wherein the judgment result is used to indicate whether the binding relationship exists between the mobile terminal and the SIM card;
   returning to the mobile terminal both the random number and the judgment result indicating whether the binding relationship exists between the mobile terminal and the SIM card;
   when the judgment result indicates that the binding relationship does not exist between the mobile terminal and the SIM card, prohibiting the mobile terminal from initializing the SIM card;
   when the judgment result indicates that the binding relationship exists between the mobile terminal and the SIM card,
      receiving encrypted data from the mobile terminal;
      authenticating, according to the encrypted data, whether the mobile terminal is capable of initializing the SIM card, and obtaining an authentication result; wherein the authentication result is used to indicate whether the mobile terminal is capable of initializing the SIM card; and
      returning the authentication result indicating whether the mobile terminal is capable of initializing the SIM card to the mobile terminal; and
   when the authentication result indicates that the mobile terminal is not capable of initializing the SIM card, prohibiting the mobile terminal from initializing the SIM card.

2. The method according to claim 1, wherein judging, according to the first IMEI, whether the binding relationship exists between the mobile terminal and the SIM card and obtaining the judgment result comprise:
   determining, when a second IMEI is pre-stored in the SIM card, whether the first IMEI matches with the second IMEI, and obtaining a determination result;
   obtaining, when the determination result indicates that the first IMEI matches with the second IMEI, the judgment result indicating that the binding relationship exists between the mobile terminal and the SIM card; and
   recording, when the second IMEI is pre-stored in the SIM card, the first IMEI to complete binding between the SIM card and the mobile terminal, and obtaining the judgment result indicating that the binding relationship exists between the mobile terminal and the SIM card.

3. The method according to claim 1, wherein the authenticating, according to the encrypted data, whether the mobile terminal is capable of initializing the SIM card and obtaining the authentication result comprise:
   performing encryption calculation on the random number according to a predetermined encryption algorithm and obtaining authenticated data; and
   comparing whether the encrypted data matches with the authenticated data and obtaining the authentication result.

4. A method for network locking of a mobile terminal, applied to the mobile terminal, the method comprising:
   sending a first International Mobile Equipment Identification Number (IMEI) of the mobile terminal to a Subscriber Identity Module (SIM) card, the first IMEI being used to judge whether a binding relationship exists between the mobile terminal and the SIM card;
   receiving a random number from the SIM card;
   when the first IMEI indicates that the binding relationship does not exist between the mobile terminal and the SIM card, prohibiting the mobile terminal from initializing the SIM card; and
   when the first IMEI indicates that the binding relationship exists between the mobile terminal and the SIM card,
      sending encrypted data used to authenticate whether the mobile terminal is capable of initializing the SIM card to the SIM card, comprising:
         determining whether a length of the random number matches with a preset length, and obtaining a determination result;
         performing, when the determination result indicates that the length of the random number matches with the preset length, encryption calculation on the random number according to a preset encryption algorithm and obtaining the encrypted data; and
         sending the encrypted data to the SIM card;
      receiving from the SIM card an authentication result which indicates whether the mobile terminal is capable of initializing the SIM card; and
      prohibiting initialization of the SIM card when the authentication result indicates that the SIM card cannot be initialized to realize network locking.

5. A device for card locking of a mobile terminal, applied to a Subscriber Identity Module (SIM) card, the device comprising: a processor configured to:
   receive a first International Mobile Equipment Identification Number (IMEI) from the mobile terminal;
   judge, according to the first IMEI, whether a binding relationship exists between the mobile terminal and the SIM card, and obtain a judgment result; wherein the judgment result is used to indicate whether the binding relationship exists between the mobile terminal and the SIM card;

generate a random number with a preset length according to the first IMEI;
return to the mobile terminal both the random number and the judgment result indicating whether the binding relationship exists between the mobile terminal and the SIM card; and
when the judgment result indicates that the binding relationship exists between the mobile terminal and the SIM card, the processor is further configured to:
receive encrypted data from the mobile terminal;
authenticate, according to the encrypted data, whether the mobile terminal is capable of initializing the SIM card, and obtain an authentication result;
wherein the authentication result is used to indicate whether the mobile terminal is capable of initializing the SIM card; and
return the authentication result indicating whether the mobile terminal is capable of initializing the SIM card to the mobile terminal.

6. The device according to claim 5, wherein the processor is further configured to:
determine, when a second IMEI is pre-stored in the SIM card, whether the first IMEI matches with the second IMEI and obtain a determination result;
obtain, when the determination result indicates that the first IMEI matches with the second IMEI, the judgment result indicating that the binding relationship exists between the mobile terminal and the SIM card; and
record, when the second IMEI is pre-stored in the SIM card, the first IMEI to complete binding between the SIM card and the mobile terminal, and obtain the judgment result indicating that the binding relationship exists between the mobile terminal and the SIM card.

7. The device according to claim 5, wherein the processor is further configured to:
perform encryption calculation on the random number according to a predetermined encryption algorithm and obtain authenticated data, and
compare whether the encrypted data matches with the authenticated data and obtain the authentication result.

8. A device for network locking of a mobile terminal, applied to the mobile terminal, the device comprising a processor configured to:
send a first International Mobile Equipment Identification Number (IMEI) of the mobile terminal to a Subscriber Identity Module (SIM) card, the first IMEI being used to judge whether a binding relationship exists between the mobile terminal and the SIM card;
receive a random number from the SIM card; and
when the first IMEI indicates that the binding relationship exists between the mobile terminal and the SIM card, the processor is further configured to:
determine whether a length of the random number matches with a preset length, and obtain a determination result;
when the determination result indicates that the length of the random number matches with the preset length, perform encryption calculation on the random number according to a preset encryption algorithm and obtain encrypted data used to authenticate whether the mobile terminal is capable of initializing the SIM card;
send the encrypted data to the SIM card;
receive an authentication result which is returned by the SIM card and indicates whether the mobile terminal is capable of initializing the SIM card; and
prohibit initialization of the SIM card when the authentication result indicates that the SIM card cannot be initialized to realize network locking.

9. A Subscriber Identity Module (SIM) card, comprising: a SIM card file system and a device for card locking of a mobile terminal, wherein:
the SIM card file system is configured to initialize information of the SIM card; and
the device for card locking of the mobile terminal comprises a processor configured to:
receive a first International Mobile Equipment Identification Number (IMEI) from the mobile terminal;
judge, according to the first IMEI, whether a binding relationship exists between the mobile terminal and the SIM card, and obtain a judgment result;
wherein the judgment result is used to indicate whether the binding relationship exists between the mobile terminal and the SIM card;
generate a random number with a preset length according to the first IMEI;
return to the mobile terminal both the random number and the judgment result indicating whether the binding relationship exists between the mobile terminal and the SIM card; and
when the judgment result indicates that the binding relationship exists between the mobile terminal and the SIM card, the processor is further configured to:
receive encrypted data from the mobile terminal;
authenticate, according to the encrypted data, whether the mobile terminal is capable of initializing the SIM card, and obtain an authentication result, wherein the authentication result is used to indicate whether the mobile terminal is capable of initializing the SIM card; and
return the authentication result indicating whether the mobile terminal is capable of initializing the SIM card to the mobile terminal.

10. A mobile terminal, comprising: a Subscriber Identity Module (SIM) card initialization system and a device for network locking of the mobile terminal, wherein:
the SIM card initialization system is configured to read, from a SIM card file system, information for initializing a SIM card, and initialize the SIM card; and
the device for network locking comprises a processor configured to:
send a first International Mobile Equipment Identification Number (IMEI) of the mobile terminal to the SIM card, the first IMEI being used to judge whether a binding relationship exists between the mobile terminal and the SIM card;
receive a random number from the SIM card; and
when the first IMEI indicates that the binding relationship exists between the mobile terminal and the SIM card, the processor is further configured to:
determine whether a length of the random number matches with a preset length, and obtain a determination result;
when the determination result indicates that the length of the random number matches with the preset length, perform encryption calculation on the random number according to a preset encryption algorithm and obtain encrypted data used to authenticate whether the mobile terminal is capable of initializing the SIM card;
send the encrypted data to the SIM card;

receive an authentication result which is returned by the SIM card and indicates whether the mobile terminal is capable of initializing the SIM card; and when the authentication result indicates that the SIM card cannot be initialized, prohibit the SIM card initialization system from reading, from the SIM card file system, the information for initializing the SIM card, and initialize the SIM card to realize network locking.

11. A non-transitory computer storage medium, having computer executable instructions stored therein configured to execute the method for card locking of a mobile terminal according to claim 1.

12. A non-transitory computer storage medium, having computer executable instructions stored therein configured to execute the method for network locking of a mobile terminal according to claim 4.

* * * * *